Sept. 16, 1952     L. H. JOHNSTON     2,611,115
AUTOMATIC CURVE FOLLOWER
Filed Oct. 26, 1945
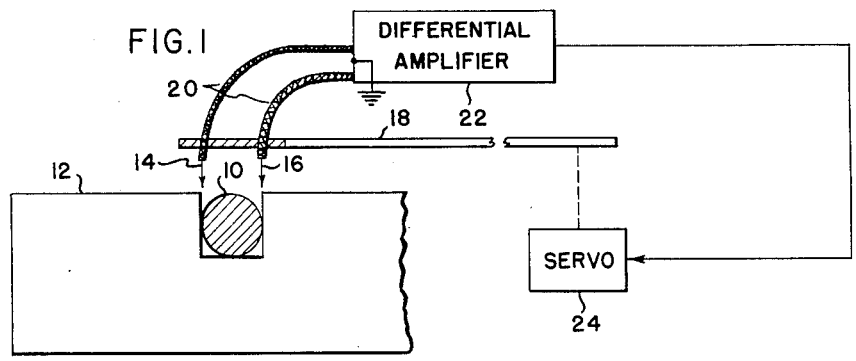
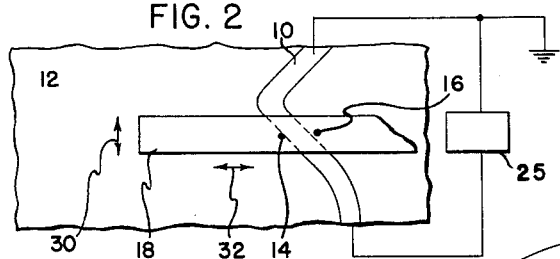
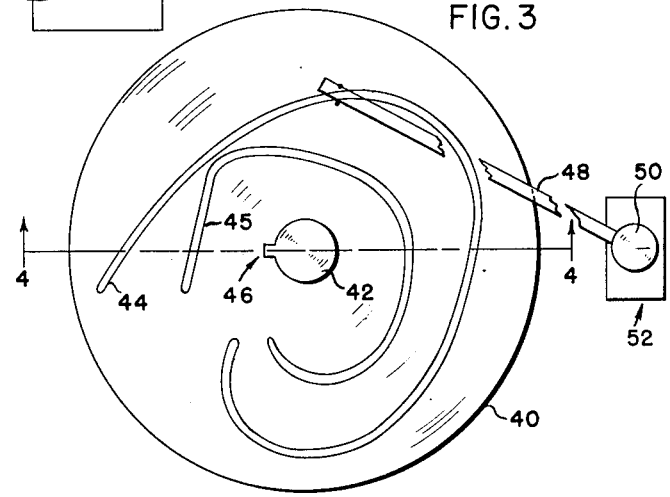
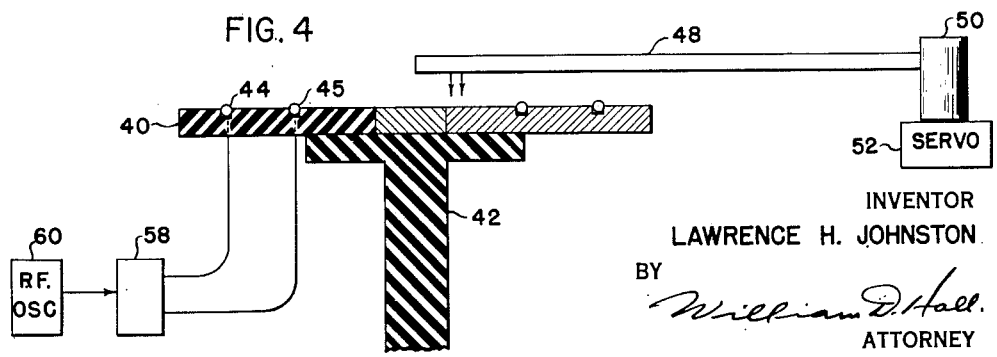
INVENTOR
LAWRENCE H. JOHNSTON
BY William D. Hall.
ATTORNEY Patented Sept. 16, 1952

2,611,115

UNITED STATES PATENT OFFICE 2,611,115

AUTOMATIC CURVE FOLLOWER

Lawrence H. Johnston, Sandoval County, N. Mex., assignor, by mesne assignments, to the United States of America as represented by the Secretary of War Application October 26, 1945, Serial No. 624,910

1 Claim. (Cl. 318—31)

This invention relates to mechanical movements and more particularly to curve-following apparatus.

In many applications it is desirable to cause a particular point or a reference marker to follow a path described by an irregular curve. Two methods that have been used previously to cause the reference marker to follow the curve are, first, to plot the curve on a chart or a disk and employ an operator to move the reference point over the curve in a predetermined manner. Obviously this system has many disadvantages. A second method that has been used is to construct a cam in the shape of the curve and attach the cam follower to the reference point. The cam may be rotated, or the follower may be made to travel over the cam at any desired rate; and the curve will be accurately reproduced by the motion of the cam follower. This method of curve following is widely used and is entirely satisfactory in many applications, but this method also has several disadvantages. In general only one curve may be cut on a cam, or if several curves are to be cut on a cam, they cannot intersect. Shifting from one cam to another, therefore, entails the removing of one cam and replacing it with another. Even if two curves are present on the same cam, some mechanical means must be provided to shift from one curve to another.

It is an object of the present invention, therefore, to present a novel system for automatically following a predetermined curve.

It is a further object of the present invention to present a curve-following system that may be switched quickly and easily from one curve to another.

For a better understanding of the invention, together with other and further objects thereof, reference is had to the following description taken in connection with the accompanying drawing in which:

Fig. 1 is a schematic diagram of the invention;

Fig. 2 is a plan view of one of the control elements that might be employed in one embodiment of this invention;

Fig. 3 is a plan view of one type of control disk that may be employed in a second embodiment of the present invention; and Fig. 4 is a sectional elevation of the control disk of Fig. 3 taken along the line 4—4 in Fig. 3.

Although two embodiments of the invention are illustrated, both embodiments are fundamentally the same, and they differ only in the type of curve to be followed. The first embodiment of the invention is designed to follow a curve that is plotted about a straight line. In this first embodiment of the invention the surface on which the curve is constructed remains stationary, and a control arm is caused to follow the curve while at the same time being moved laterally along a line parallel to the reference line about which the curve was plotted. In the second embodiment the curve is plotted on a surface designed to be rotated about its center. A control arm of fixed length is designed to pivot about a point and follow the curve as the surface is rotated.

Referring now more particularly to Fig. 1 of the drawing, there is shown a control wire 10 imbedded in a control sheet 12. Two electrostatic probes 14 and 16 are supported above wire 10 by a control arm 18. Probes 14 and 16 are connected by flexible leads 20 to a differential amplifier 22. The differential amplifier may be of the well known push pull balanced type in which separate signals are applied to the control grids and the output connected to respond to differences in the input signal characteristics. An amplifier output circuit which is responsive to differences in input signals may be found illustrated in Terman's "Radio Engineers' Handbook," page 937, Figure 44, McGraw-Hill Book Company, Inc., N. Y., 1943. Differential amplifier 22 controls the operation of a servo unit 24. Servo unit 24 may be of the D. C. reversible type which has a field energized by the differential amplifier 24; such servo units are described in "Principles of Radar," Sections 12–20; 12–21, Staff, M. I. T. Radar School; The Technical Press, M. I. T., Cambridge, Mass., 1944. Servo unit 24 is connected to control arm 18 in such a manner that control arm 18 is positioned in response to the output of amplifier 22.

Fig. 2 shows a partial plan view of control wire 10, control sheet 12 and control arm 18 of Fig. 1. Probes 14 and 16 of Fig. 1 are indicated in Fig. 2 by the dots numbered 14 and 16, respectively. The connections to probes 14 and 16 are not shown in Fig. 2. Control sheet 12 is a sheet of dielectric material that has a groove in the top surface that corresponds to the curve that is to be reproduced by this device. The above mentioned groove serves to hold control wire 10 in position. Control wire 10 is excited with a radio frequency voltage of some convenient frequency, for example 100 kilocycles, by means of radio frequency oscillator 25. A suitable traversing mechanism (not shown) causes control arm 18 to move in the direction indicated by arrow 30 in Fig. 2. This motion of control arm 18 may be controlled in any desired manner, but usually control arm 18 will move at a predetermined uniform rate of speed. The motion of control arm 18 in the directions indicated by the double-headed arrow 32 of Fig. 2 is controlled by the servo mechanism 24 of Fig. 1. This motion is accomplished in the following manner. The amplitude of the signals picked up by probes 14 and 16 are compared in amplifier 22, Fig. 1, and a signal is produced in the output amplifier 22 that is indicative of the relative amplitudes of the signals received by probes 14 and 16. This signal is applied to servo mechanism 24 which in turn moves control arm 18 in the proper direction to equalize the amplitude of the signals received by probes 14 and 16. From a study of Figs. 1 and 2 it can be seen that equal signals will be received by probes 14 and 16 when these two probes are equidistant from the center of wire 10. Thus, when control arm 18 is made to move across control sheet 12 in the manner stated above, a point midway between probes 14 and 16 will reproduce exactly the curve defined by the axis of wire 20. It is obvious that any suitable indicating or control means may be attached to control arm 18 if desired. It should be noted at this point that several different curves may be laid out on control disk 12 at one time, but control arm 18 will follow only the curve indicated by the wire that is energized. A further advantage of this method of curve following is that several control arms may be used to follow several curves on the control sheet 12 provided that each curve is energized with a different frequency and the differential amplifier associated with each control arm is designed to receive only a narrow band of frequencies. Only one curve and control arm have been shown in Figs. 1 and 2, as this is all that is required to illustrate the operation of the invention. Since no moving part touches control sheet 12, simple changing means may be employed to hold it in place, therefore, it is possible to replace any control sheet that is in use with a control sheet having a different curve or set of curves with a minimum of effort and delay.

The second embodiment of this invention employs a circular disk for a control sheet. The curve is laid out on this disk in such a manner that the entire curve will be traced in slightly less than one revolution of the disk. The control head in this embodiment of the invention is pivoted at one end, and the other end is made to follow the curve by a suitable servo mechanism. This embodiment of the invention may be more fully understood by reference to Figs. 3 and 4 where there is shown a circular control disk 40 supported on a shaft 42. Control wires 44 and 45 are imbedded in grooves in the top surface of disk 40. A key 46 on shaft 42 serves to maintain disk 40 and shaft 42 in a fixed position relative to one another. A control arm 48 is supported by a rotatable shaft 50 on servo mechanism 52. Two electro static probes 54 and 56 similar to probes 14 and 16, Fig. 1, are supported on control arm 48. The differential amplifier that connects probes 54 and 56 to servo mechanism 52 is not shown in Figs. 3 and 4 but will be identical to Fig. 1 in this respect. A switch 58 permits a radio frequency oscillator 60 to be connected to either wire 44 or wire 45 but not both at once.

The operation of the system shown in Figs. 3 and 4 is substantially the same as the operation of the system shown in Figs. 1 and 2. Control disk 40 is rotated at a predetermined rate through the action of shaft 42. Servo mechanism 52 positions arm 48 so that probes 54 and 56 receive equal signals from either wire 44 or wire 45 depending on which wire is excited at any instant. By operating switch 58, control arm 48 may be made to follow either curve 44 or curve 45.

A system similar to that described in connection with Figs. 3 and 4 might be employed to replace the cam and cam follower employed in the copending application of Luis W. Alvarez and Lawrence H. Johnston (R. L. 7-1) Serial No. 523,878, filed February 25, 1944. In this application a potentiometer arm might be positioned proportional to the angle between arm 48 and a fixed reference line passing through the center of shaft 50.

The embodiments illustrated in Figs. 1 to 4 inclusive may be modified by utilizing two substantially parallel imbedded conductors to replace the single conductor shown. The conductors are excited by signals of different frequencies. The two pickup probes shown are replaced by a single probe. Differential amplifier is adapted to cause the probe to be moved in such a manner that the relative amplitudes of the signals at the two frequencies are picked up, but the probe remains constant.

A further modification of the embodiment illustrated in Figs. 1 and 2 would be to form the control sheet into a cylinder. Such an arrangement would reduce the mechanical difficulties which might be manifest in the arrangement shown.

The advantages of this system that have been pointed out in connection with the description of the operation of this device can be summarized as follows. This invention employs a relatively simple control disk, sheet or cylinder. This invention is capable of being shifted from one curve to another quickly and easily; the control disks may be easily removed and replaced by another control disk having a different family of curves, and this invention may be used with linear or circular control surfaces.

While there have been described what are at present considered the preferred embodiments of the invention, it will be obvious to those skilled in the art that various changes and modifications may be made therein without departing from the invention.

What is claimed is:

A curve-following device comprising alternating current signal means, a dielectric disc mounted for rotation about a normal axis thereof, electrical conducting means energized by said signal means and affixed to said disc in such a manner as to represent a desired curve, means for rotating said disc about said axis at a constant rate, differential amplifier means, a support, first and second probe means mounted on said support and connected to said amplifier means, said first and second probe means electrostatically coupled to said conducting means, means connected to the output of said amplifier and mechanically coupled to said support so as to move said support in accordance with said amplifier output thereby causing the probe means to follow the desired curve.

LAWRENCE H. JOHNSTON.

REFERENCES CITED

The following references are of record in the file of this patent:

UNITED STATES PATENTS

| Number | Name | Date |
|---|---|---|
| 1,976,298 | Richter | Oct. 9, 1934 |
| 2,354,391 | McCourt | July 25, 1944 |

FOREIGN PATENTS

| Number | Country | Date |
|---|---|---|
| 750,075 | France | Aug. 3, 1933 |